United States Patent
Zhang et al.

(10) Patent No.: US 12,439,400 B2
(45) Date of Patent: Oct. 7, 2025

(54) PILOT SYMBOL FOR SCHEDULED UPLINK OCCASION

(71) Applicant: QUALCOMM Incorporated, San Diego, CA (US)

(72) Inventors: Qian Zhang, Basking Ridge, NJ (US); Junyi Li, Fairless Hills, PA (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 705 days.

(21) Appl. No.: 17/448,505

(22) Filed: Sep. 22, 2021

(65) Prior Publication Data

US 2023/0092970 A1    Mar. 23, 2023

(51) Int. Cl.
| | |
|---|---|
| *H04W 72/1263* | (2023.01) |
| *H04L 5/00* | (2006.01) |
| *H04L 5/14* | (2006.01) |
| *H04W 24/08* | (2009.01) |
| *H04W 72/23* | (2023.01) |

(52) U.S. Cl.
CPC ....... *H04W 72/1263* (2013.01); *H04L 5/0048* (2013.01); *H04L 5/14* (2013.01); *H04W 24/08* (2013.01); *H04W 72/23* (2023.01)

(58) Field of Classification Search
CPC .............................................. H04W 72/1263
See application file for complete search history.

(56) References Cited

U.S. PATENT DOCUMENTS

| | | | |
|---|---|---|---|
| 2018/0083679 A1* | 3/2018 | Lim .................... | H04B 17/336 |
| 2020/0127692 A1* | 4/2020 | Zhang ............... | H04W 72/1215 |
| 2020/0313779 A1* | 10/2020 | Kim ...................... | H04B 17/24 |
| 2021/0258100 A1* | 8/2021 | Hassan ............. | H04W 72/0453 |
| 2021/0281360 A1 | 9/2021 | Xu et al. | |
| 2022/0159580 A1* | 5/2022 | Su ........................ | H04W 72/23 |
| 2022/0225124 A1* | 7/2022 | Suh .......................... | H04L 5/14 |

OTHER PUBLICATIONS

International Search Report and Written Opinion—PCT/US2022/076650—ISA/EPO—Jan. 3, 2023.

* cited by examiner

*Primary Examiner* — Abdeltif Ajid
(74) *Attorney, Agent, or Firm* — QUALCOMM Incorporated

(57) ABSTRACT

Various aspects of the present disclosure generally relate to wireless communication. In some aspects, a user equipment (UE) may receive scheduling information for an uplink transmission and a downlink reception in full-duplex. The UE may transmit, in a symbol prior to a resource associated with the uplink transmission, a reference signal. The UE may perform at least one of the uplink transmission or the downlink reception based at least in part on a measurement result associated with the reference signal. Numerous other aspects are described.

30 Claims, 9 Drawing Sheets

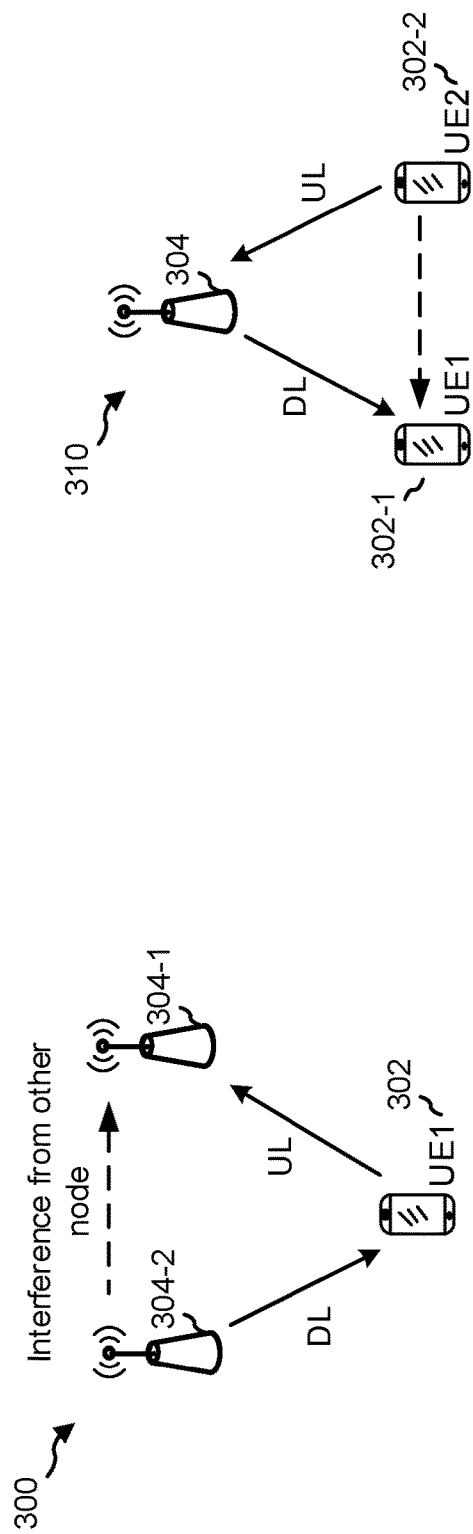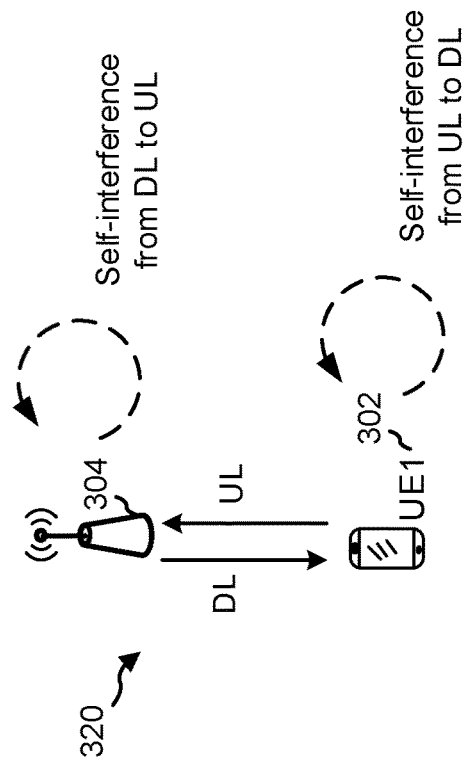
FIG. 3B
FIG. 3C
FIG. 3A

PILOT SYMBOL FOR SCHEDULED UPLINK OCCASION

FIELD OF THE DISCLOSURE

Aspects of the present disclosure generally relate to wireless communication and to techniques and apparatuses for a pilot symbol for scheduled uplink occasion.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving scheduling information for an uplink transmission and a downlink reception in full-duplex. The method may include transmitting, in a symbol prior to a resource associated with the uplink transmission, a reference signal. The method may include performing at least one of the uplink transmission or the downlink reception based at least in part on a measurement result associated with the reference signal.

Some aspects described herein relate to a method of wireless communication performed by a base station. The method may include transmitting scheduling information for an uplink transmission by a UE and a downlink transmission to the UE in full-duplex. The method may include configuring, in a symbol prior to a resource associated with the uplink transmission, a reference signal to be transmitted by the UE. The method may include performing at least one of the downlink transmission or reception of the uplink transmission based at least in part on the reference signal.

Some aspects described herein relate to a UE for wireless communication. The UE may include a memory and one or more processors coupled to the memory. The one or more processors may be configured to receive scheduling information for an uplink transmission and a downlink reception in full-duplex. The one or more processors may be configured to transmit, in a symbol prior to a resource associated with the uplink transmission, a reference signal. The one or more processors may be configured to perform at least one of the uplink transmission or the downlink reception based at least in part on a measurement result associated with the reference signal.

Some aspects described herein relate to a base station for wireless communication. The base station may include a memory and one or more processors coupled to the memory. The one or more processors may be configured to transmit scheduling information for an uplink transmission by a UE and a downlink transmission to the UE in full-duplex. The one or more processors may be configured to configure, in a symbol prior to a resource associated with the uplink transmission, a reference signal to be transmitted by the UE. The one or more processors may be configured to perform at least one of the downlink transmission or reception of the uplink transmission based at least in part on the reference signal.

Some aspects described herein relate to a non-transitory computer-readable medium that stores a set of instructions for wireless communication by a UE. The set of instructions, when executed by one or more processors of the UE, may cause the UE to receive scheduling information for an uplink transmission and a downlink reception in full-duplex. The set of instructions, when executed by one or more processors of the UE, may cause the UE to transmit, in a symbol prior to a resource associated with the uplink transmission, a reference signal. The set of instructions, when executed by one or more processors of the UE, may cause the UE to perform at least one of the uplink transmission or the downlink reception based at least in part on a measurement result associated with the reference signal.

Some aspects described herein relate to a non-transitory computer-readable medium that stores a set of instructions for wireless communication by a base station. The set of instructions, when executed by one or more processors of the base station, may cause the base station to transmit scheduling information for an uplink transmission by a UE and a downlink transmission to the UE in full-duplex. The set of instructions, when executed by one or more processors of the base station, may cause the base station to configure, in a symbol prior to a resource associated with the uplink transmission, a reference signal to be transmitted by the UE. The set of instructions, when executed by one or more processors of the base station, may cause the base station to perform at least one of the downlink transmission or reception of the uplink transmission based at least in part on the reference signal.

Some aspects described herein relate to an apparatus for wireless communication. The apparatus may include means for receiving scheduling information for an uplink transmission and a downlink reception in full-duplex. The apparatus may include means for transmitting, in a symbol prior to a resource associated with the uplink transmission, a reference signal. The apparatus may include means for performing at least one of the uplink transmission or the downlink reception based at least in part on a measurement result associated with the reference signal.

Some aspects described herein relate to an apparatus for wireless communication. The apparatus may include means for transmitting scheduling information for an uplink transmission by a UE and a downlink transmission to the UE in full-duplex. The apparatus may include means for configuring, in a symbol prior to a resource associated with the uplink transmission, a reference signal to be transmitted by the UE. The apparatus may include means for performing at least one of the downlink transmission or reception of the uplink transmission based at least in part on the reference signal.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3A-3C are diagrams illustrating examples of full duplex (FD) communication in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
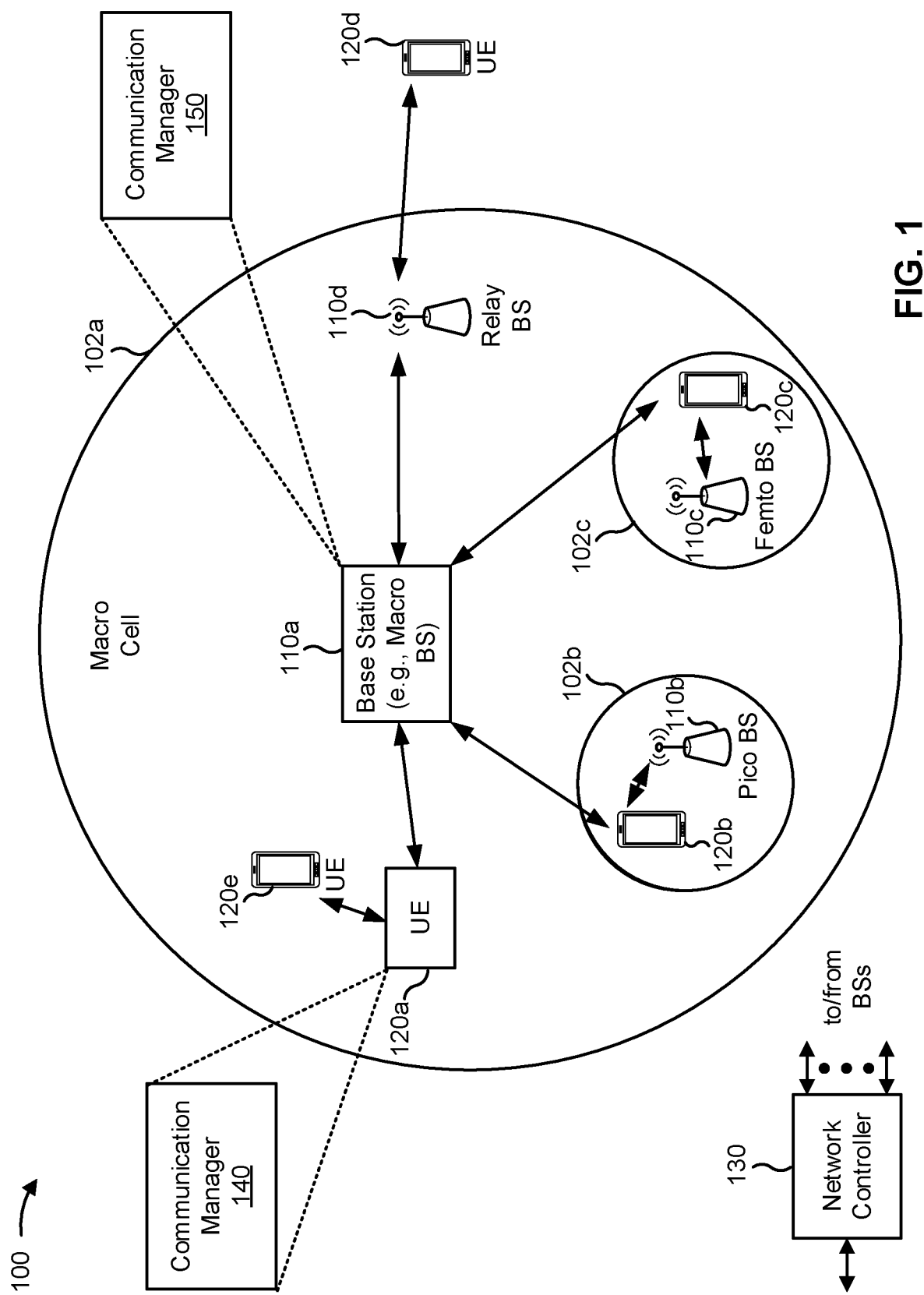
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive scheduling information for an uplink transmission and a downlink reception in full-duplex; transmit, in a symbol prior to a resource associated with the uplink transmission, a reference signal; and perform at least one of the uplink transmission or the downlink reception based at least in part on a measurement result associated with the reference signal. Additionally, or alternatively, the communication manager 140 may perform one or more other operations described herein.

In some aspects, the base station 110 may include a communication manager 150. As described in more detail elsewhere herein, the communication manager 150 may transmit scheduling information for an uplink transmission by a UE and a downlink transmission to the UE in full-duplex; configure, in a symbol prior to a resource associated with the uplink transmission, a reference signal to be transmitted by the UE; and perform at least one of the downlink transmission or reception of the uplink transmission based at least in part on the reference signal. Additionally, or alternatively, the communication manager 150 may perform one or more other operations described herein.

As indicated above, FIG. 1 is provided as an example. Other examples may differ from what is described with regard to FIG. 1.

Figure 2:
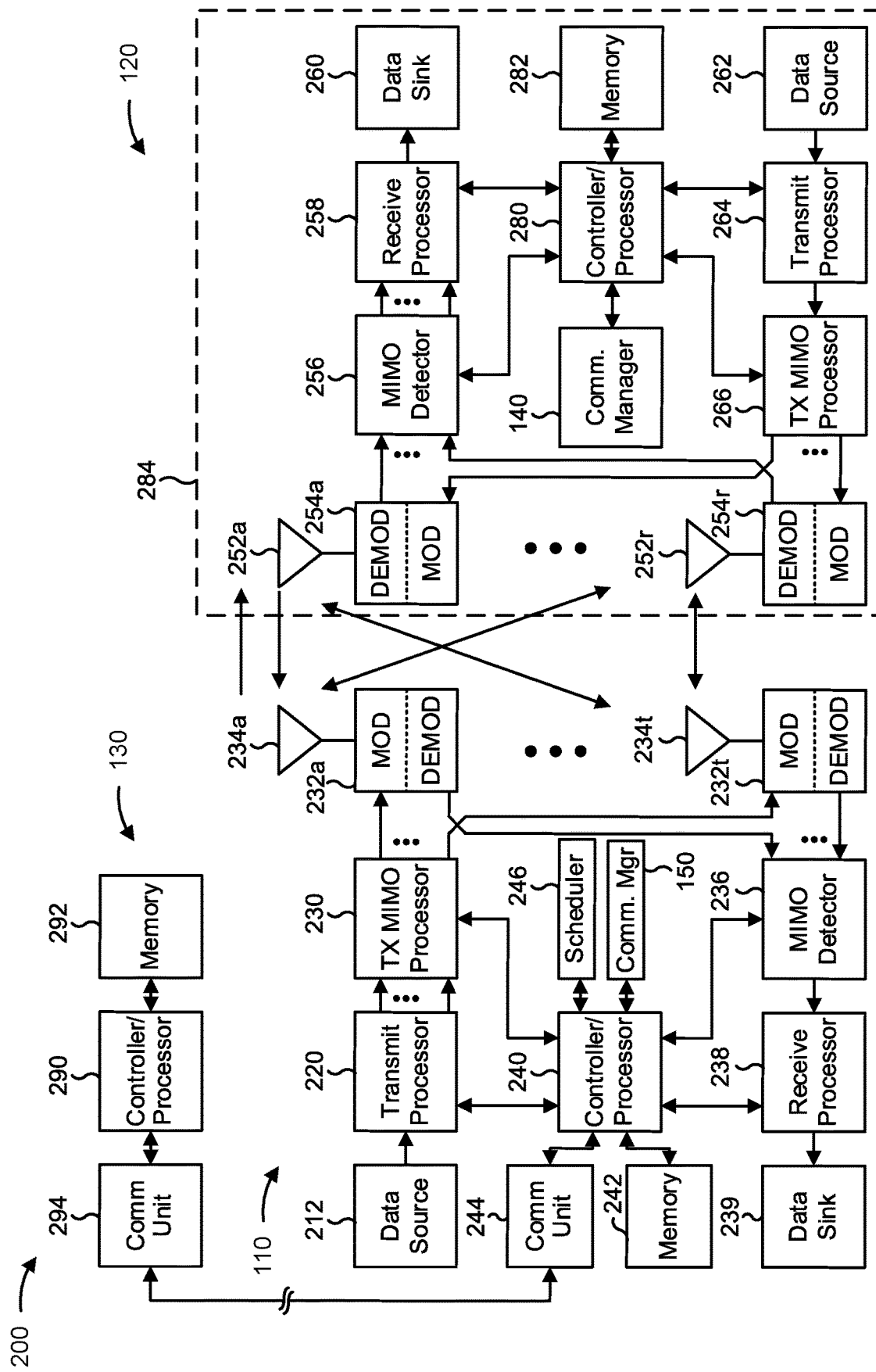
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-9).

The controller/processor 240 of the base station 110, the controller/processor 280 of the UE 120, and/or any other component(s) of FIG. 2 may perform one or more techniques associated with full-duplex communication using a reference signal resource, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the UE includes means for receiving scheduling information for an uplink transmission and a downlink reception in full-duplex; means for transmitting, in a symbol prior to a resource associated with the uplink transmission, a reference signal; and/or means for performing at least one of the uplink transmission or the downlink reception based at least in part on a measurement result associated with the reference signal. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting scheduling information for an uplink transmission by a UE and a downlink transmission to the UE in full-duplex; means for configuring, in a symbol prior to a resource associated with the uplink transmission, a reference signal to be transmitted by the UE; and/or means for performing at least one of the downlink transmission or reception of the uplink transmission based at least in part on the reference signal. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

FIGS. 3A-3C are diagrams illustrating examples 300, 310, 320 of full duplex (FD) communication in accordance with the present disclosure. An FD communication is a communication that utilizes overlapped time resources at a single node for transmission and reception. For example, a UE or a base station may perform a transmission and a reception using the same time resources, such as via frequency division multiplexing (FDM) or spatial division multiplexing (SDM). "FDM" refers to performing two or more communications using different frequency resource allocations. "SDM" refers to performing two or more communications using different spatial parameters, such as different transmission configuration indication (TCI) states corresponding to beams. An SDM communication can use overlapped time resources and frequency resources, and an FDM communication can use overlapped time resources and spatial resources (that is, overlapped beam parameters, TCI states, or the like). A TCI state indicates a spatial parameter for a communication. For example, a TCI state for a communication may identify a source signal (such as a synchronization signal block, a channel state information reference signal, or the like) and a spatial parameter to be derived from the source signal for the purpose of transmitting or receiving the communication. For example, the TCI state may indicate a quasi-colocation (QCL) type. A QCL type may indicate one or more spatial parameters to be derived from the source signal. The source signal may be referred to as a QCL source. FD communications can include dynamic traffic (such as scheduled by downlink control information (DCI)) and/or semi-static traffic. Semi-static traffic is traffic associated with a semi-persistent resource, such as a semi-persistent scheduling (SPS) configured resource or a configured grant (CG).

The example 300 of FIG. 3A includes a UE1 302 and two base stations (e.g., TRPs) 304-1, 304-2, wherein the UE1 302 is sending UL transmissions to base station 304-1 and is receiving DL transmissions from base station 304-2. In the example 300 of FIG. 3A, FD is enabled for the UE1 302, but not for the base stations 304-1, 304-2. Thus, the base stations 304-1 and 304-2 are half duplex (HD) base stations. The example 310 of FIG. 3B includes two UEs, UE1 302-1 and UE2 302-2, and a base station 304, wherein the UE1 302-1 is receiving a DL transmission from the base station 304 and the UE2 302-2 is transmitting a UL transmission to the base station 304. In the example 310 of FIG. 3B, FD is enabled for the base station 304, but not for the UEs UE1 302-1 and UE2 302-2. Thus, the UEs UE1 302-1 and UE2 302-2 are half duplex UEs. The example 320 of FIG. 3C includes a UE1 302 and a base station 304, wherein the UE1 302 is receiving a DL transmission from the base station 304 and the UE1 302 is transmitting a UL transmission to the base station 304. In the example 320 of FIG. 3C, FD is enabled for both the UE1 302 and the base station 304.

In FIGS. 3A-3C, interference is indicated by dashed lines. Interference can occur between nodes of examples 300, 310, 320 (referred to as "cross-link interference"). Examples of cross-link interference are shown in FIGS. 3A and 3B. In FIG. 3A, BS 304-2's downlink transmission interferes with BS 304-1's uplink transmission. In FIG. 3B, UE1 302-1's uplink transmission interferes with UE2 302-2's downlink transmission. In some cases, self-interference can occur. Self-interference occurs when a node's transmission interferes with a reception operation of the node. For example, self-interference may occur due to reception by a receive antenna of radiated energy from a transmit antenna, cross-talk between components, or the like. Examples of self-interference at a UE 302 (from an uplink transmission to a downlink reception) and at a BS 304 (from a downlink transmission to an uplink reception) are shown in FIG. 3C. It should be noted that the above-described cross-link interference and self-interference conditions can occur in HD deployments and in FD deployments.

As indicated above, FIGS. 3A-3C are provided as one or more examples. Other examples may differ from what is described with regard to FIGS. 3A-3C.

FD communication (described above) may enable simultaneous uplink/downlink transmission in some frequency ranges, such as FR 2. An FD capability can be present at the base station, the UE, or both. For example, at the UE, an uplink transmission can be from one panel and a downlink reception can use another panel. As another example, at the base station, the uplink reception can use one panel and the downlink transmission can be from a second panel. In some cases, an FD capability may be conditional on, for example, beam separation, self-interference, clutter echo, or the like. FD communication may provide latency reduction, spectrum efficiency enhancement (such as per cell and per UE), and more efficient resource utilization.

In FD communication, there may be simultaneous downlink transmissions (such as a physical downlink shared channel (PDSCH), a semi-persistent scheduling (SPS) communication, a synchronization signal block (SSB), or the like) and uplink transmissions (such as a physical uplink shared channel (PUSCH), a configured grant (CG) communication, a sounding reference signal (SRS), or a physical random access channel (PRACH). These communications can be scheduled individually, or via a single radio resource control (RRC) or downlink control information (DCI) message. The UE may perform periodic beam management (according to a beam management cycle) to determine whether beam pairs for downlink and uplink transmissions are sufficient to enable the downlink and uplink transmissions (for example, in view of changing environment and channel conditions). As used herein, "beam pair" refers to an uplink transmit beam and a downlink receive beam at a UE, or a downlink transmit beam and an uplink receive beam at a base station. However, the beam management cycle is associated with significant overhead, so the beam management cycle may be configured with a relatively large periodicity (relative to the downlink and uplink communications).

If a beam management cycle is configured with a relatively large periodicity, then there may be scheduled periodic or aperiodic FD communications before the next beam management cycle is performed. Thus, the beams (e.g., transmission configuration indicator (TCI) states) associated with the downlink and uplink transmissions may be outdated, non-compatible, or failed (for example, due to increased self-interference). This may lead to reduced throughput, increased self-interference, and failure of FD communications.

Some techniques and apparatuses described herein provide configuration and transmission of a signal (referred to herein as a reference signal or a pilot signal) prior to an uplink transmission (such as a resource for the uplink transmission) in an FD mode. For example, the UE may receive configuration information indicating one or more symbols in which to transmit the signals. The one or more symbols may be prior to a resource associated with an uplink communication (such as immediately prior, a number of symbols prior, or the like). The UE may transmit a signal in the one or more symbols, and may use this signal to measure self-interference on a beam used for a downlink transmission that is duplexed with the uplink transmission. Thus, the UE can determine self-interference more frequently than a beam management cycle may provide, which reduces overhead associated with beam management, increases throughput, reduces self-interference, and reduces the occurrence of failure of FD communications. Furthermore, the usage of an uplink-only reference signal (as compared to a reference signal duplexed with a downlink communication) may provide more accurate feedback regarding self-interference than a reference signal duplexed with a downlink communication.

Figure 4:
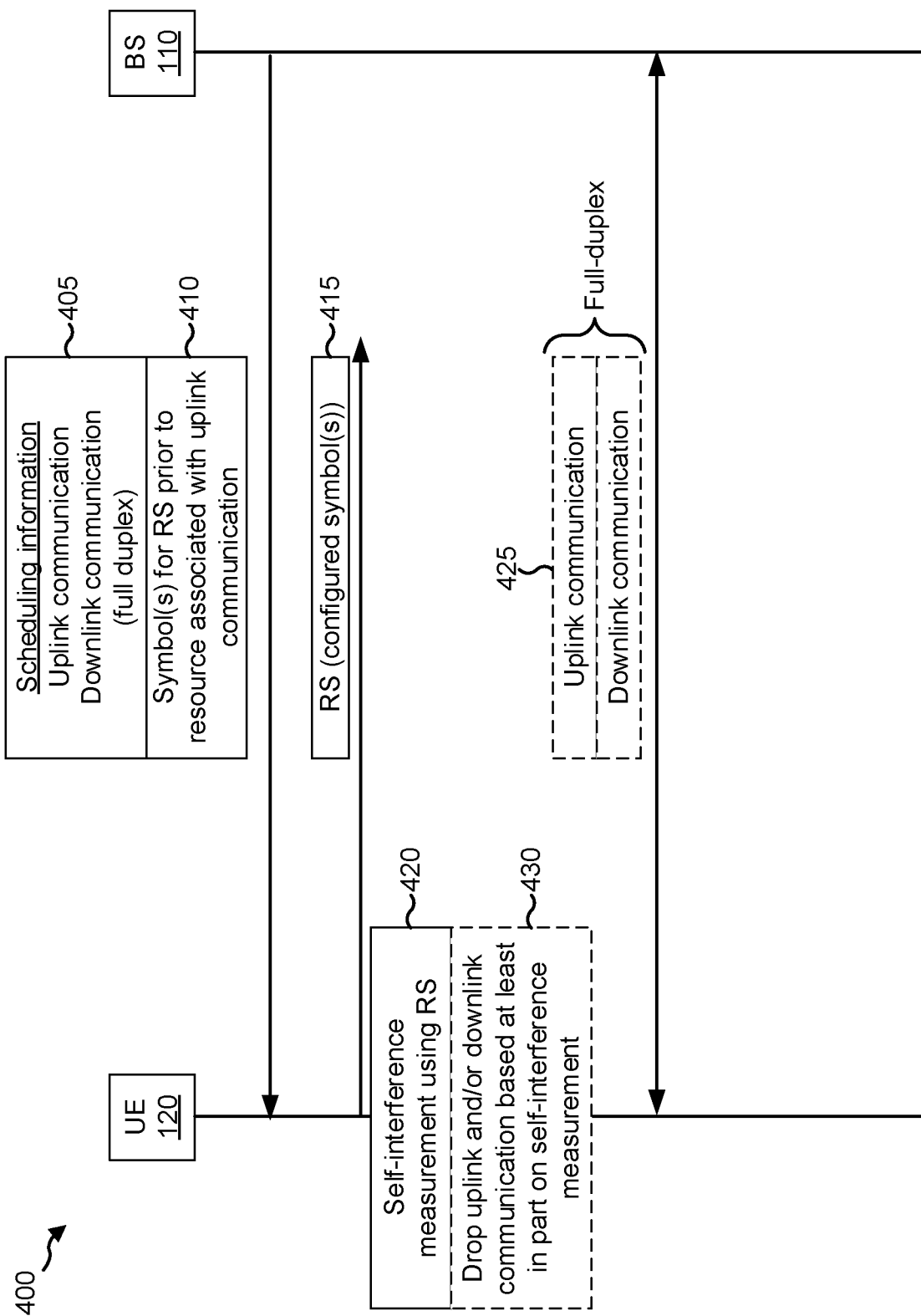
FIG. 4 is a diagram illustrating an example of signaling associated with transmission of a signal prior to an uplink resource of an FD communication, in accordance with the present disclosure.

FIG. 4 is a diagram illustrating an example 400 of signaling associated with transmission of a signal prior to an uplink resource of an FD communication, in accordance with the present disclosure. As shown, example 400 includes a UE 120 and a BS 110.

As shown in FIG. 4, the BS 110 may transmit, and the UE 120 may receive, scheduling information. For example, the scheduling information may be provided via configuration information (such as RRC signaling), MAC signaling, DCI, or a combination thereof. In some aspects, the scheduling information may dynamically schedule a communication, such as via DCI. In some aspects, the scheduling information may configure a resource for a communication, such as an SPS communication or a CG communication. In some aspects, the scheduling information may activate a configured resource, such as for an SPS communication or a CG communication. In some aspects, the scheduling information may configure, schedule, or trigger a PRACH, an SRS, a channel state information reference signal (CSI-RS), an SSB, or another form of signaling. The scheduling information can be provided via a single message or multiple different messages. As shown, the scheduling information may schedule an uplink communication and a downlink communication in full duplex.

SPS involves the configuration of periodic resources (referred to herein as "SPS occasions") for downlink communication, such as to a UE 120. SPS is suitable for communications involving data arriving in periodic bursts. The usage of persistent resources reduces overhead associated with DCI. A subset of resource allocation information for the periodic resources may be provided via RRC signaling (where the resource allocation information conveyed by the RRC signaling is referred to as an SPS configuration, and the resource allocation information indicates the SPS occasions), and remaining resource allocation information may be provided via DCI. The DCI also acts as an activation trigger for the SPS configuration. An SPS configuration may indicate a periodicity (e.g., a time interval between consecutive SPS occasions), a resource for feedback, a modulation and coding scheme, and so on.

A CG indicates a resource allocation (referred to as a CG occasion) on which a UE 120 can perform an uplink transmission without having to receive an individual resource allocation via DCI. A UE 120 may receive a CG configuration via configuration information. The CG configuration may indicate an MCS, a resource allocation, and so on. In some aspects, a subset of resource allocation information for the CG may be provided via RRC signaling (where the resource allocation information conveyed by the RRC signaling is referred to as the CG configuration, and the resource allocation information indicates CG occasions), and remaining resource allocation information may be provided via DCI. The DCI also acts as an activation trigger for the CG configuration.

As shown by reference number 410, the BS 110 may transmit, and the UE 120 may receive, information indicating one or more symbols for a reference signal (RS) prior to a resource associated with the uplink communication. For example, the BS 110 may configure the insertion of one or more signals (e.g., pilot signals, reference signals) on one or more symbols before the uplink communication. The UE 120 can use the one or more signals to measure self-interference on a downlink reception beam of the downlink communication scheduled by the scheduling information before the downlink communication is performed. In some aspects, dynamic signaling may indicate whether to insert a symbol associated with a reference signal. For example, DCI may include an indication of whether to insert a symbol associated with a reference signal for an uplink transmission scheduled by the DCI.

In some aspects, a rule may specify whether to insert a symbol associated with a reference signal. For example, a configured rule (configured by the BS 110) or a rule defined in a wireless communication specification may indicate whether to insert a symbol associated with a reference signal. As one example, the rule may indicate to insert the symbol if there are no scheduled FD transmissions or no uplink-only transmissions from a beam used for the uplink communication within the last Y millliseconds. As another example, the rule may indicate to insert the symbol every X overlapped CG occasions.

Figure 5:
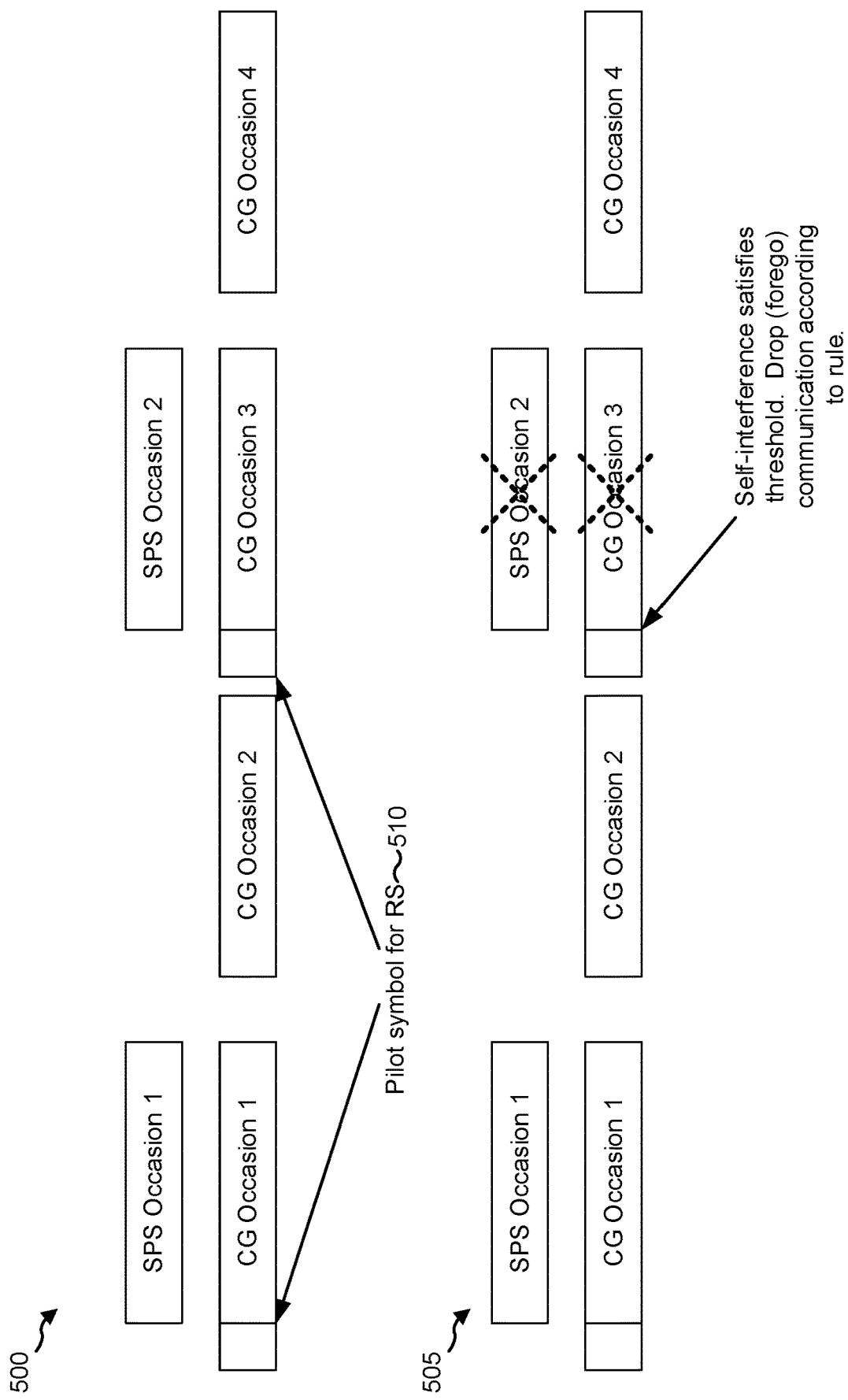
FIG. 5 is a diagram illustrating an example of one or more symbols for a reference signal prior to an uplink communication, and an example of prioritization of communications based at least in part on the RS, in accordance with the present disclosure.

FIG. 5 is a diagram illustrating an example 500 of one or more symbols for an RS prior to an uplink communication, and an example 505 of prioritization of communications based at least in part on the RS, in accordance with the present disclosure. Example 505 is described in more detail elsewhere herein. As shown in example 500, and by reference number 510, the BS 110 may configure a set of symbols (referred to in FIG. 5 as "pilot symbols") on which the UE 120 is to transmit a reference signal. In some aspects, the set of symbols may be configured immediately prior to an uplink communication (e.g., on a symbol immediately prior to a first symbol of the uplink communication). In some aspects, the set of symbols may be configured N symbols (e.g., a number of symbols) prior to an uplink communication (for example, the set of symbols may be configured on each of the N symbols, on only the Nth symbol, or on a subset of the N symbols).

In some aspects, the set of symbols may be configured prior to each uplink communication. For example, the set of symbols may be configured on each dynamic PUSCH or each occasion of a CG configuration. In some other aspects, as shown in example 500, the set of symbols may be configured prior to a subset of uplink communications. For example, the set of symbols may be configured prior to each uplink communication that is duplexed with a downlink communication. As another example, the set of symbols may be configured prior to a subset of uplink communications that are duplexed with downlink communications (e.g., every second uplink communication that is duplexed with a downlink communication). As yet another example, the set of symbols may be configured based at least in part on a periodicity (e.g., a symbol may be configured in every 10 occasion of a CG configuration).

In some aspects, the configuration of the one or more symbols may indicate a power control parameter for the one or more symbols. For example, in some aspects, a transmit power of the reference signal may be the same as for the uplink communication. In some other aspects, the transmit power of the reference signal may be different than a transmit power of the uplink communication. For example, the reference signal may have a reduced transmit power relative to the uplink communication.

Returning to FIG. 4, as shown by reference number 415, the UE 120 may transmit one or more reference signals in the one or more configured symbols. The one or more reference signals may include any form of signal. In some aspects, the one or more reference signals may be referred to herein as signals or pilot signals. In some aspects, the UE 120 may transmit the one or more reference signals using a same transmit beam (e.g., uplink beam) as is scheduled for the uplink communication when the uplink transmission is performed in full-duplex with the downlink reception. In some aspects, the UE 120 may transmit the reference signal in half-duplex (e.g., while no downlink reception is ongoing).

As shown by reference number 420, the UE 120 may perform a self-interference measurement using the reference signal to determine the measurement result. For example, the UE 120 may measure self-interference from the reference signal (transmitted using an uplink beam associated with the uplink transmission) on a downlink communication of the UE to determine a measurement result. The measurement result may indicate a level of self-interference on the downlink communication. In this case, the UE 120 may measure the self-interference using a downlink beam associated with the downlink communication. For example, the UE 120 may measure the self-interference using a receive beam that is configured or scheduled for the downlink communication. Thus, the UE 120 may determine self-interference between a fully duplexed downlink communication and uplink communication, which enables the UE 120 to take corrective action if the self-interference satisfies a threshold.

As shown by reference number 425, the UE 120 may perform one or more of the uplink communication and the downlink communication. For example, if the UE 120 determines, based at least in part on the self-interference measurement, that self-interference is lower than a threshold, then the UE 120 may perform the uplink communication and the downlink communication in full-duplex. As shown by reference number 430, and by example 505 of FIG. 5, if the self-interference measurement satisfies a threshold (which can be configured by the BS 110 or specified in a wireless communication specification), the UE 120 may drop one or more of the uplink communication or the downlink communication. As used herein, "dropping a communication" can refer to forgoing the communication, cancelling the communication, skipping reception or transmission of the communication, releasing a resource of the communication for other use, or the like.

In some aspects, the UE 120 may drop a communication based at least in part on a rule. In some aspects, the rule may be based at least in part on respective priorities of the uplink communication and the downlink communication. In some aspects, the respective priorities may be indicated by the scheduling information. In some aspects, the respective priorities may be based at least in part on types of the communications. For example, an SPS or a dynamic PDSCH may have a higher priority than an uplink CG, or vice versa.

If a downlink communication (e.g., a downlink channel associated with the downlink communication) has a higher priority than an uplink communication (e.g., an uplink channel associated with the uplink communication), then the rule may indicate to drop the uplink communication, thereby saving power at the UE 120. In this case, the UE 120 may transmit information indicating that the uplink communication was dropped. For example, the UE 120 may transmit a bit or a field with feedback, such as an acknowledgment or negative acknowledgment (ACK/NACK), for the downlink communication that indicates that the UE 120 has or will drop the uplink communication in a number of transmission occasions of the uplink communication, or for a length of time. Thus, the BS 110 can allocate the resources of the number of transmission occasions for other use. In some aspects, the UE 120 may switch to an HD mode from an FD mode based at least in part on dropping the uplink communication. In some aspects, the UE 120 or the BS 110 may insert a symbol for a reference signal a number of symbols before the uplink communication (e.g., N symbols before the uplink communication), such as in addition to a symbol immediately prior to the uplink communication, so that the UE 120 has sufficient time to process the measurement results and be prepared to drop the uplink communication.

If a downlink communication (e.g., a downlink channel associated with the downlink communication) has a lower priority than an uplink communication (e.g., an uplink channel associated with the uplink communication), then the rule may indicate to drop the downlink communication (e.g., forgo reception of the downlink communication), thereby saving power at the UE 120. In this case, the UE 120 may transmit information indicating that the downlink communication was dropped. For example, the UE 120 may transmit a bit or a field with the uplink communication that indicates that the UE 120 will drop the downlink communication in a number of transmission occasions of the downlink communication, or for a length of time. In some aspects, the UE 120 may switch to an HD mode based at least in part on dropping the downlink communication. Thus, the BS 110 can allocate the resources of the number of transmission occasions for other use. In some aspects, the UE 120 or the BS 110 may insert a symbol immediately prior to the uplink communication, since the uplink communication may be transmitted in either case.

In some aspects, if the downlink communication and the uplink communication have equal priority, then the UE 120 may drop the uplink communication or the downlink communication based at least in part on a rule in a wireless communication specification indicating whether to drop the uplink communication or the downlink communication if the uplink communication and the downlink communication have equal priority. In some aspects, if the downlink communication and the uplink communication have equal priority, then the UE 120 may drop the uplink communication or the downlink communication based at least in part on a rule preconfigured for the UE indicating whether to drop the uplink communication or the downlink communication if the uplink communication and the downlink communication have equal priority.

In some aspects, the UE 120 may drop the downlink communication irrespective of priorities of the uplink communication and the downlink communication. For example, it may be simpler to recover a downlink communication than an uplink communication, so by dropping the downlink communication, the UE 120 may conserve communication resources that would otherwise be used to buffer and retransmit an uplink communication.

As indicated above, FIGS. 4 and 5 are provided as one or more examples. Other examples may differ from what is described with regard to FIGS. 4 and 5.

Figure 6:
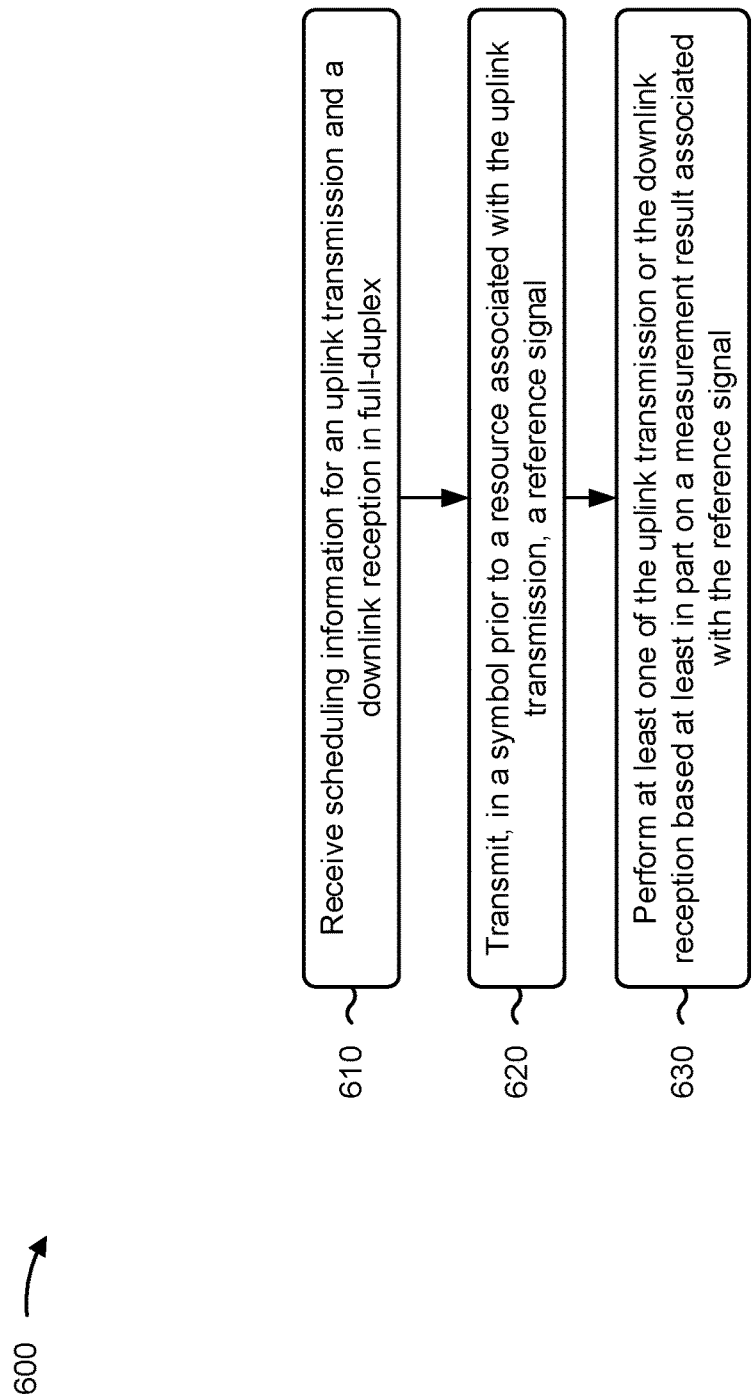
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., UE 120, an apparatus of UE 120) performs operations associated with a reference signal symbol for a scheduled uplink occasion.

As shown in FIG. 6, in some aspects, process 600 may include receiving scheduling information for an uplink transmission and a downlink reception in full-duplex (block 610). For example, the UE (e.g., using communication manager 140 and/or reception component 802, depicted in FIG. 8) may receive scheduling information for an uplink transmission and a downlink reception in full-duplex, as described above. The uplink transmission may be referred to herein as an uplink communication. The downlink reception may be referred to herein as a downlink communication.

As further shown in FIG. 6, in some aspects, process 600 may include transmitting, in a symbol prior to a resource associated with the uplink transmission, a reference signal (block 620). For example, the UE (e.g., using communication manager 140 and/or transmission component 804, depicted in FIG. 8) may transmit, in a symbol prior to a resource associated with the uplink transmission, a reference signal, as described above.

As further shown in FIG. 6, in some aspects, process 600 may include performing at least one of the uplink transmission or the downlink reception based at least in part on a measurement result associated with the reference signal (block 630). For example, the UE (e.g., using communication manager 140, reception component 802, and/or transmission component 804, depicted in FIG. 8) may perform at least one of the uplink transmission or the downlink reception based at least in part on a measurement result associated with the reference signal, as described above.

Process 600 may include additional aspects, such as any single aspect or any combination of aspects described below and/or in connection with one or more other processes described elsewhere herein.

In a first aspect, the reference signal is transmitted using a beam that is used for the uplink transmission when the uplink transmission is performed in full-duplex.

Figure 8:
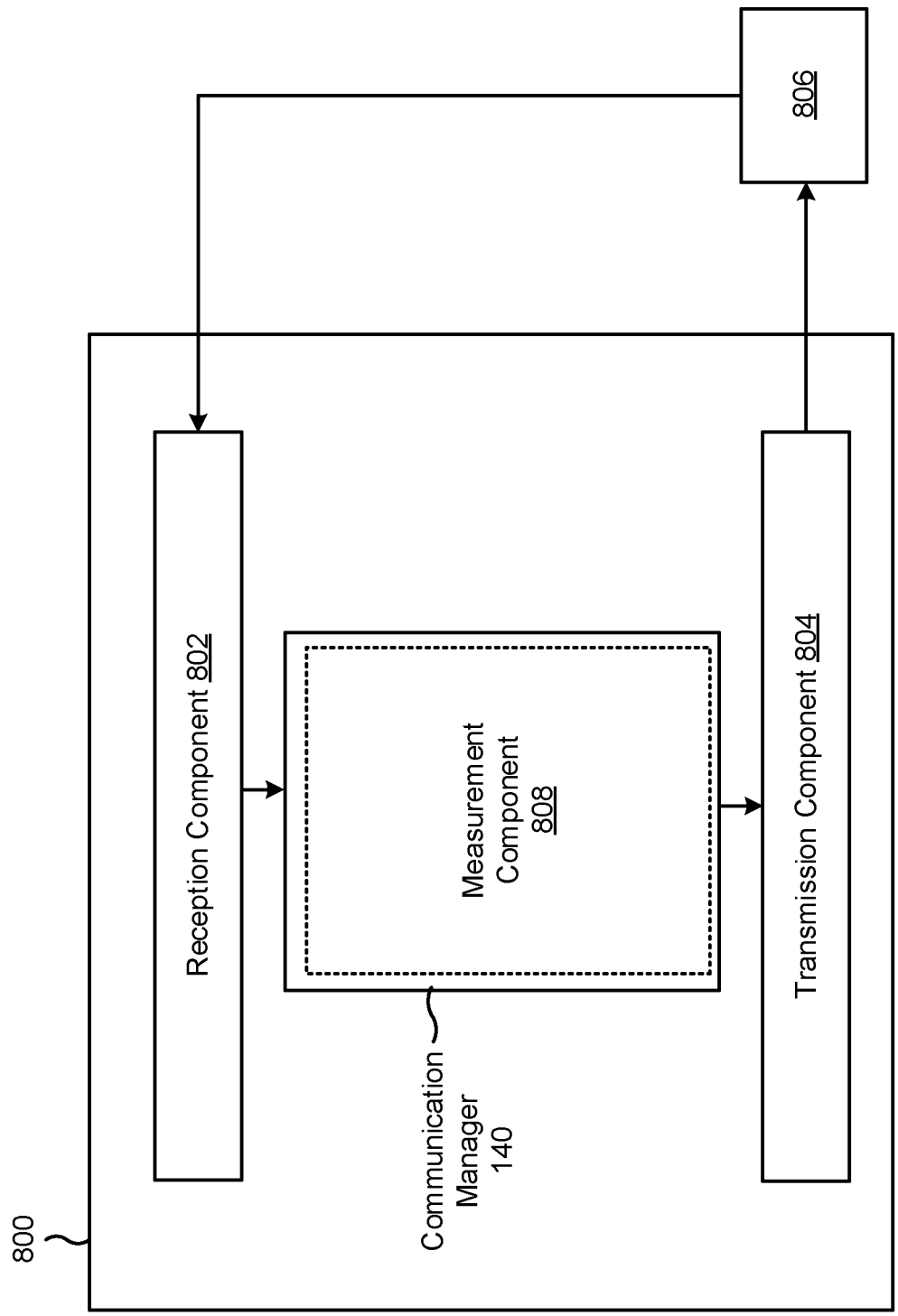
FIG. 8 is a diagram of an example apparatus for wireless communication, in accordance with the present disclosure.

In a second aspect, alone or in combination with the first aspect, process 600 includes performing (e.g., using communication manager 140 and/or measurement component 808, depicted in FIG. 8) a self-interference measurement using the reference signal to determine the measurement result, wherein the self-interference measurement uses a downlink beam associated with the downlink reception, wherein the reference signal is transmitted using an uplink beam associated with the uplink transmission, and wherein performing at least one of the uplink transmission or the downlink reception is based at least in part on the self-interference measurement.

In a third aspect, alone or in combination with one or more of the first and second aspects, the symbol is configured on a number of symbols prior to the uplink transmission.

In a fourth aspect, alone or in combination with one or more of the first through third aspects, the symbol is immediately prior to the uplink transmission.

In a fifth aspect, alone or in combination with one or more of the first through fourth aspects, the uplink transmission comprises a dynamic shared channel.

In a sixth aspect, alone or in combination with one or more of the first through fifth aspects, the uplink transmission is on an occasion of a configured grant.

In a seventh aspect, alone or in combination with one or more of the first through sixth aspects, the uplink transmission is associated with multiple transmission occasions, and each of the multiple transmission occasions is configured with a respective symbol for transmission of a respective reference signal.

In an eighth aspect, alone or in combination with one or more of the first through seventh aspects, the uplink transmission is associated with multiple transmission occasions, and a subset of the multiple transmission occasions are configured with a respective symbol for transmission of a respective reference signal.

In a ninth aspect, alone or in combination with one or more of the first through eighth aspects, the uplink transmission and the reference signal are associated with a same transmit power.

In a tenth aspect, alone or in combination with one or more of the first through ninth aspects, the uplink transmission is associated with a first transmit power and the reference signal is associated with a second transmit power different than the first transmit power.

In an eleventh aspect, alone or in combination with one or more of the first through tenth aspects, process 600 includes receiving, prior to transmitting the reference signal, downlink control information including an indication to transmit the reference signal.

In a twelfth aspect, alone or in combination with one or more of the first through eleventh aspects, process 600 includes determining to transmit the reference signal based at least in part on a rule.

In a thirteenth aspect, alone or in combination with one or more of the first through twelfth aspects, the rule is based at least in part on there having been no prior full-duplex communications within a threshold length of time of the uplink transmission.

In a fourteenth aspect, alone or in combination with one or more of the first through thirteenth aspects, the rule is based at least in part on a number of overlapped configured grant occasions.

In a fifteenth aspect, alone or in combination with one or more of the first through fourteenth aspects, the measurement result is a self-interference measurement associated with the reference signal that satisfies a threshold, and performing at least one of the uplink transmission or the downlink reception further comprises dropping the uplink transmission based at least in part on the self-interference measurement satisfying the threshold and based at least in part on a priority of the uplink transmission being lower than a priority of the downlink reception.

In a sixteenth aspect, alone or in combination with one or more of the first through fifteenth aspects, process 600 includes transmitting, in association with feedback associated with the downlink reception, an indication that the uplink transmission was dropped or will be dropped in a number of upcoming transmission occasions.

In a seventeenth aspect, alone or in combination with one or more of the first through sixteenth aspects, the measurement result is a self-interference measurement associated with the reference signal that satisfies a threshold, and performing at least one of the uplink transmission or the downlink reception further comprises dropping the downlink reception based at least in part on the self-interference measurement satisfying the threshold and based at least in part on a priority of the uplink transmission being higher than a priority of the downlink reception.

In an eighteenth aspect, alone or in combination with one or more of the first through seventeenth aspects, process 600 includes transmitting, in association with the uplink transmission, an indication that the downlink reception was dropped or will be dropped in a number of upcoming reception occasions.

In a nineteenth aspect, alone or in combination with one or more of the first through eighteenth aspects, the measurement result is a self-interference measurement associated with the reference signal that satisfies a threshold, and performing at least one of the uplink transmission or the downlink reception further comprises dropping a selected communication, of the downlink reception or the uplink transmission, based at least in part on the self-interference measurement satisfying the threshold and based at least in part on a rule indicating which communication to drop when a priority of the uplink transmission is equal to a priority of the downlink reception.

In a twentieth aspect, alone or in combination with one or more of the first through nineteenth aspects, the measurement result is a self-interference measurement associated with the reference signal that satisfies a threshold, and performing at least one of the uplink transmission or the downlink reception further comprises transmitting the uplink transmission and dropping the downlink reception.

In a twenty-first aspect, alone or in combination with one or more of the first through twentieth aspects, the reference signal is transmitted in half-duplex.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
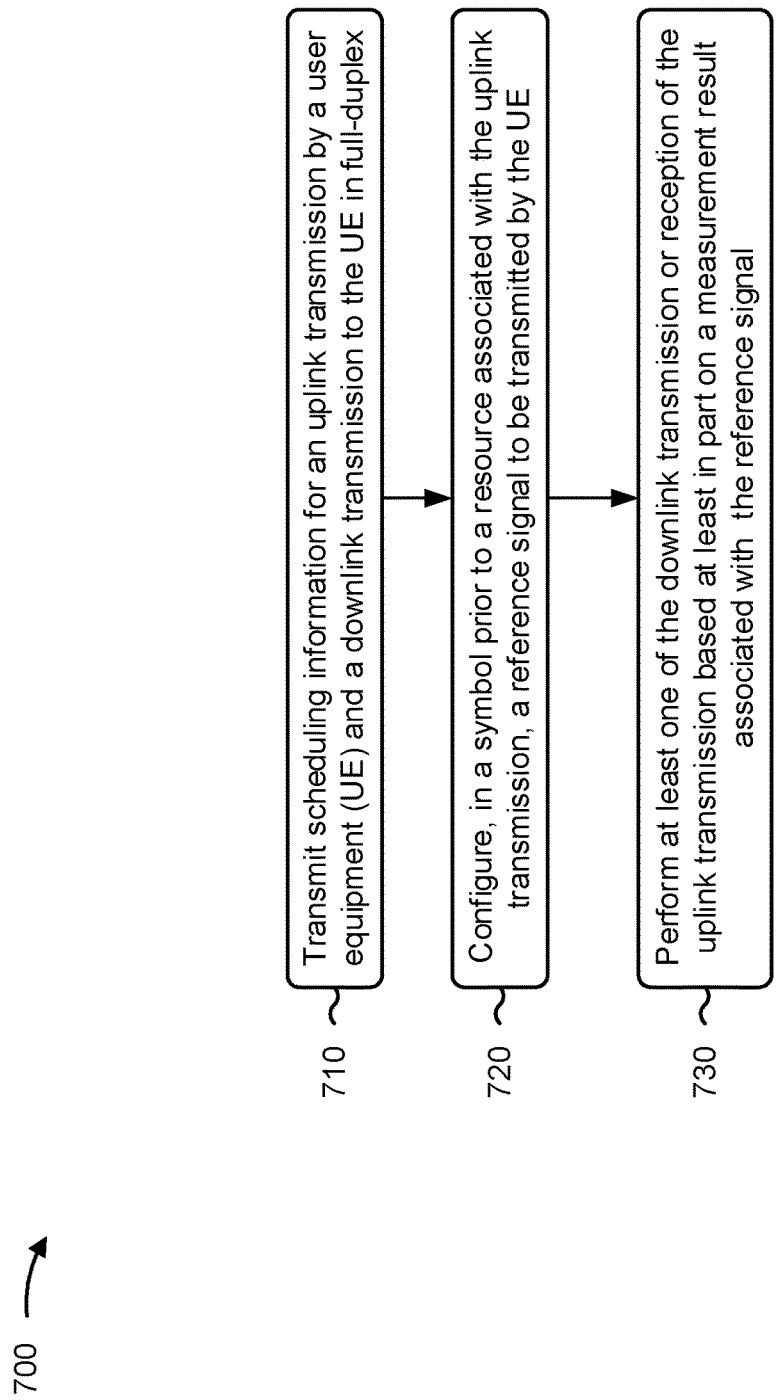
FIG. 7 is a diagram illustrating an example process performed, for example, by a base station, in accordance with the present disclosure.

FIG. 7 is a diagram illustrating an example process 700 performed, for example, by a base station, in accordance with the present disclosure. Example process 700 is an example where the base station (e.g., base station 110) performs operations associated with a reference signal symbol for a scheduled uplink occasion.

As shown in FIG. 7, in some aspects, process 700 may include transmitting scheduling information for an uplink transmission by a UE and a downlink transmission to the UE in full-duplex (block 710). For example, the base station (e.g., using communication manager 150 and/or transmission component 904, depicted in FIG. 9) may transmit scheduling information for an uplink transmission by a UE and a downlink transmission to the UE in full-duplex, as described above. As used herein, "in full-duplex" may refer to the UE transmitting the uplink transmission and receiving the downlink transmission simultaneously. Additionally, or alternatively, the UE may be in a full-duplex mode when the uplink transmission is transmitted and the downlink transmission is received.

As further shown in FIG. 7, in some aspects, process 700 may include configuring, in a symbol prior to a resource associated with the uplink transmission, a reference signal to be transmitted by the UE (block 720). For example, the base station (e.g., using communication manager 150 and/or configuration component 908, depicted in FIG. 9) may configure, in a symbol prior to a resource associated with the uplink transmission, a reference signal to be transmitted by the UE, as described above.

As further shown in FIG. 7, in some aspects, process 700 may include performing at least one of the downlink transmission or reception of the uplink transmission based at least in part on a measurement result associated with the reference signal (block 730). For example, the base station (e.g., using communication manager 150 and/or reception component 902 or transmission component 904, depicted in FIG. 9) may perform at least one of the downlink transmission or reception of the uplink transmission based at least in part on a measurement result associated with the reference signal, as described above.

Process 700 may include additional aspects, such as any single aspect or any combination of aspects described below and/or in connection with one or more other processes described elsewhere herein.

In a first aspect, the symbol is configured on a number of symbols prior to the uplink transmission.

In a second aspect, alone or in combination with the first aspect, the symbol is immediately prior to the uplink transmission.

In a third aspect, alone or in combination with one or more of the first and second aspects, the uplink transmission comprises a dynamic shared channel.

In a fourth aspect, alone or in combination with one or more of the first through third aspects, the uplink transmission is on an occasion of a configured grant.

In a fifth aspect, alone or in combination with one or more of the first through fourth aspects, the uplink transmission is associated with multiple transmission occasions, and each of the multiple transmission occasions is configured with a respective symbol for transmission of a respective reference signal.

In a sixth aspect, alone or in combination with one or more of the first through fifth aspects, the uplink transmission is associated with multiple transmission occasions, and a subset of the multiple transmission occasions are configured with a respective symbol for transmission of a respective reference signal.

In a seventh aspect, alone or in combination with one or more of the first through sixth aspects, the uplink transmission and the reference signal are associated with a same transmit power.

In an eighth aspect, alone or in combination with one or more of the first through seventh aspects, the uplink transmission is associated with a first transmit power and the reference signal is associated with a second transmit power different than the first transmit power.

In a ninth aspect, alone or in combination with one or more of the first through eighth aspects, process 700 includes transmitting, prior to the reference signal, downlink control information including an indication of whether to transmit the reference signal.

In a tenth aspect, alone or in combination with one or more of the first through ninth aspects, process 700 includes receiving, in association with feedback associated with the uplink transmission, an indication that the uplink transmission was dropped or will be dropped in a number of upcoming transmission occasions.

In an eleventh aspect, alone or in combination with one or more of the first through tenth aspects, process 700 includes receiving, in association with the uplink transmission, an indication that reception of the downlink transmission was dropped or will be dropped in a number of upcoming reception occasions.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram of an example apparatus 800 for wireless communication, in accordance with the present disclosure. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include a measurement component 808, among other examples.

In some aspects, the apparatus 800 may be configured to perform one or more operations described herein in connection with FIGS. 3-5. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive scheduling information for an uplink transmission and a downlink reception in full-duplex. The transmission component 804 may transmit, in a symbol prior to a resource associated with the uplink transmission, a reference signal. The transmission component 804 or the reception component 802 may perform at least one of the uplink transmission or the downlink reception based at least in part on a measurement result associated with the reference signal.

The measurement component 808 may perform a self-interference measurement using the reference signal to determine the measurement result, wherein performing at least one of the uplink transmission or the downlink reception is based at least in part on the self-interference measurement.

The reception component 802 may receive, prior to transmitting the reference signal, an indication to transmit the reference signal.

The transmission component 804 may determine to transmit the reference signal.

The transmission component 804 may transmit an indication that the uplink transmission was dropped.

The transmission component 804 may transmit an indication that the downlink reception was dropped.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
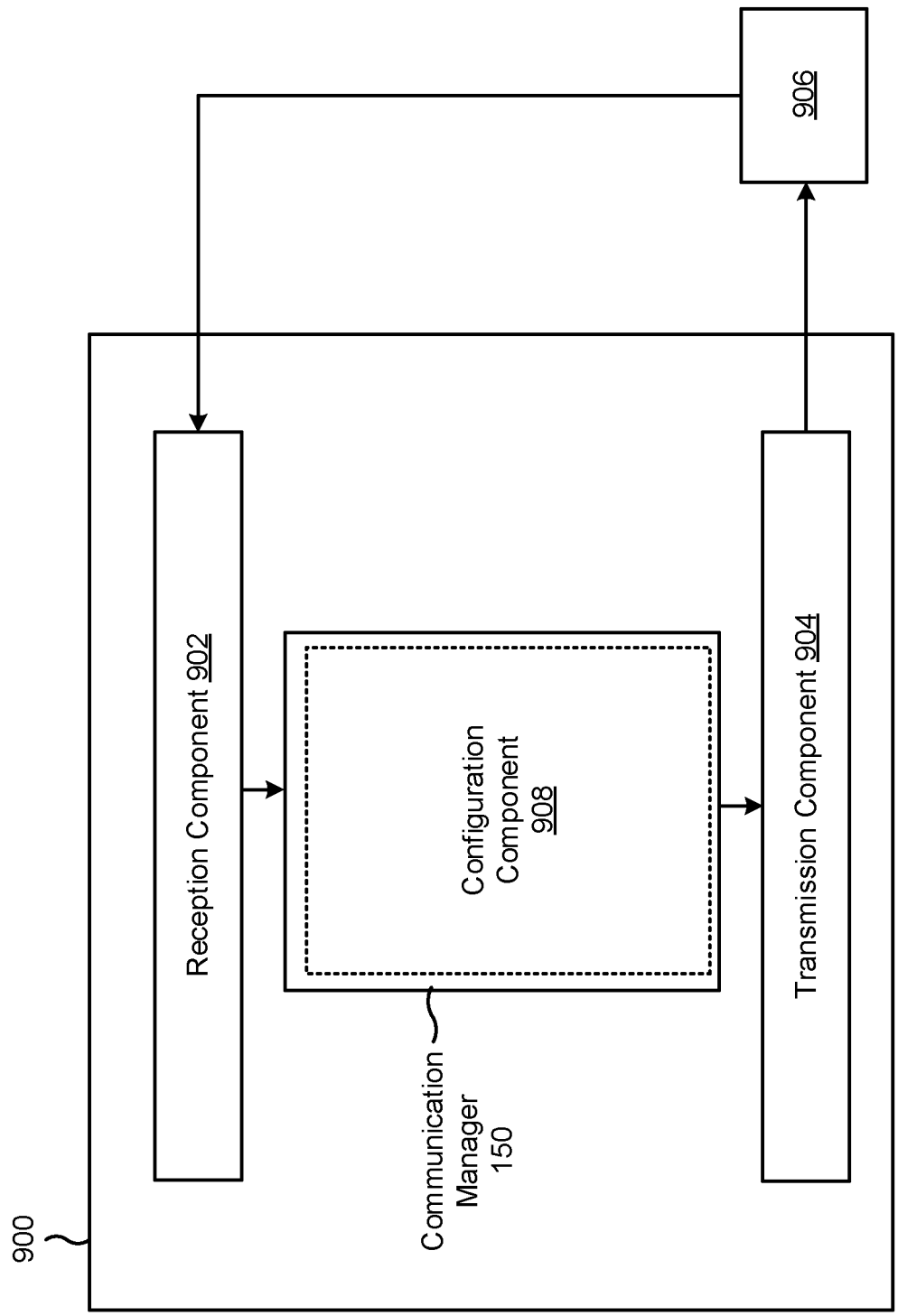
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include a configuration component 908, among other examples.

In some aspects, the apparatus 900 may be configured to perform one or more operations described herein in connection with FIGS. 3-5. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the base station described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the base station described in connection with FIG. 2. In some aspects, the transmission component 904 may be co-located with the reception component 902 in a transceiver.

The transmission component 904 may transmit scheduling information for an uplink transmission by a UE and a downlink transmission to the UE in full-duplex. The configuration component 908 may configure, in a symbol prior to a resource associated with the uplink transmission, a reference signal to be transmitted by the UE. The transmission component 904 or the reception component 902 may perform at least one of the downlink transmission or reception of the uplink transmission based at least in part on the reference signal.

The transmission component 904 may transmit, prior to the reference signal, an indication of whether to transmit the reference signal.

The reception component 902 may receive an indication that the uplink transmission was dropped.

The reception component 902 may receive an indication that reception of the downlink transmission was dropped.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving scheduling information for an uplink transmission and a downlink reception in full-duplex; transmitting, in a symbol prior to a resource associated with the uplink transmission, a reference signal; and performing at least one of the uplink transmission or the downlink reception based at least in part on a measurement result associated with the reference signal.

Aspect 2: The method of Aspect 1, wherein the reference signal is transmitted using a beam that is used for the uplink transmission when the uplink transmission is performed in full-duplex.

Aspect 3: The method of any of Aspects 1-2, further comprising: performing a self-interference measurement using the reference signal to determine the measurement result, wherein the self-interference measurement uses a downlink beam associated with the downlink reception, wherein the reference signal is transmitted using an uplink beam associated with the uplink transmission, and wherein performing at least one of the uplink transmission or the downlink reception is based at least in part on the self-interference measurement.

Aspect 4: The method of any of Aspects 1-3, wherein the symbol is configured on a number of symbols prior to the uplink transmission.

Aspect 5: The method of any of Aspects 1-4, wherein the symbol is immediately prior to the uplink transmission.

Aspect 6: The method of any of Aspects 1-5, wherein the uplink transmission comprises a dynamic shared channel.

Aspect 7: The method of any of Aspects 1-5, wherein the uplink transmission is on an occasion of a configured grant.

Aspect 8: The method of any of Aspects 1-7, wherein the uplink transmission is associated with multiple transmission occasions, and wherein each of the multiple transmission occasions is configured with a respective symbol for transmission of a respective reference signal.

Aspect 9: The method of any of Aspects 1-8, wherein the uplink transmission is associated with multiple transmission occasions, and wherein a subset of the multiple transmission occasions are configured with a respective symbol for transmission of a respective reference signal.

Aspect 10: The method of any of Aspects 1-9, wherein the uplink transmission and the reference signal are associated with a same transmit power.

Aspect 11: The method of any of Aspects 1-10, wherein the uplink transmission is associated with a first transmit power and the reference signal is associated with a second transmit power different than the first transmit power.

Aspect 12: The method of any of Aspects 1-11, further comprising: receiving, prior to transmitting the reference signal, downlink control information including an indication to transmit the reference signal.

Aspect 13: The method of any of Aspects 1-12, further comprising: determining to transmit the reference signal based at least in part on a rule.

Aspect 14: The method of Aspect 13, wherein the rule is based at least in part on there having been no prior full-duplex communications within a threshold length of time of the uplink transmission.

Aspect 15: The method of Aspect 13, wherein the rule is based at least in part on a number of overlapped configured grant occasions.

Aspect 16: The method of any of Aspects 1-15, wherein the measurement result is a self-interference measurement associated with the reference signal that satisfies a threshold, and wherein performing at least one of the uplink transmission or the downlink reception further comprises: dropping the uplink transmission based at least in part on the self-interference measurement satisfying the threshold and based at least in part on a priority of the uplink transmission being lower than a priority of the downlink reception.

Aspect 17: The method of Aspect 16, further comprising: transmitting, in association with feedback associated with the downlink reception, an indication that the uplink transmission was dropped or will be dropped in a number of upcoming transmission occasions.

Aspect 18: The method of any of Aspects 1-17, wherein the measurement result is a self-interference measurement associated with the reference signal that satisfies a threshold, and wherein performing at least one of the uplink transmission or the downlink reception further comprises: dropping the downlink reception based at least in part on the self-interference measurement satisfying the threshold and based at least in part on a priority of the uplink transmission being higher than a priority of the downlink reception.

Aspect 19: The method of Aspect 18, further comprising: transmitting, in association with the uplink transmission, an indication that the downlink reception was dropped or will be dropped in a number of upcoming reception occasions.

Aspect 20: The method of any of Aspects 1-19, wherein the measurement result is a self-interference measurement associated with the reference signal that satisfies a threshold, and wherein performing at least one of the uplink transmission or the downlink reception further comprises: dropping a selected communication, of the downlink reception or the uplink transmission, based at least in part on the self-interference measurement satisfying the threshold and based at least in part on a rule indicating which communication to drop when a priority of the uplink transmission is equal to a priority of the downlink reception.

Aspect 21: The method of any of Aspects 1-20, wherein the measurement result is a self-interference measurement associated with the reference signal that satisfies a threshold, and wherein performing at least one of the uplink transmission or the downlink reception further comprises: transmitting the uplink transmission and dropping the downlink reception.

Aspect 22: The method of any of Aspects 1-22, wherein the reference signal is transmitted in half-duplex.

Aspect 23: A method of wireless communication performed by a base station, comprising: transmitting scheduling information for an uplink transmission by a user equipment (UE) and a downlink transmission to the UE in full-duplex; configuring, in a symbol prior to a resource associated with the uplink transmission, a reference signal to be transmitted by the UE; and performing at least one of the downlink transmission or reception of the uplink transmission based at least in part on the reference signal.

Aspect 24: The method of Aspect 23, wherein the symbol is configured on a number of symbols prior to the uplink transmission.

Aspect 25: The method of any of Aspects 23-24, wherein the symbol is immediately prior to the uplink transmission.

Aspect 26: The method of any of Aspects 23-25, wherein the uplink transmission comprises a dynamic shared channel.

Aspect 27: The method of any of Aspects 23-26, wherein the uplink transmission is on an occasion of a configured grant.

Aspect 28: The method of any of Aspects 23-27, wherein the uplink transmission is associated with multiple transmission occasions, and wherein each of the multiple transmission occasions is configured with a respective symbol for transmission of a respective reference signal.

Aspect 29: The method of any of Aspects 23-28, wherein the uplink transmission is associated with multiple transmission occasions, and wherein a subset of the multiple transmission occasions are configured with a respective symbol for transmission of a respective reference signal.

Aspect 30: The method of any of Aspects 23-29, wherein the uplink transmission and the reference signal are associated with a same transmit power.

Aspect 31: The method of any of Aspects 23-30, wherein the uplink transmission is associated with a first transmit power and the reference signal is associated with a second transmit power different than the first transmit power.

Aspect 32: The method of any of Aspects 23-31, further comprising: transmitting, prior to the reference signal, downlink control information including an indication of whether to transmit the reference signal.

Aspect 33: The method of any of Aspects 23-32, further comprising: receiving, in association with feedback associated with the uplink transmission, an indication that the uplink transmission was dropped or will be dropped in a number of upcoming transmission occasions.

Aspect 34: The method of any of Aspects 23-33, further comprising: receiving, in association with the uplink transmission, an indication that reception of the downlink transmission was dropped or will be dropped in a number of upcoming reception occasions.

Aspect 35: An apparatus for wireless communication at a device, comprising a processor; memory coupled with the processor; and instructions stored in the memory and executable by the processor to cause the apparatus to perform the method of one or more of Aspects 1-34.

Aspect 36: A device for wireless communication, comprising a memory and one or more processors coupled to the memory, the one or more processors configured to perform the method of one or more of Aspects 1-34.

Aspect 37: An apparatus for wireless communication, comprising at least one means for performing the method of one or more of Aspects 1-34.

Aspect 38: A non-transitory computer-readable medium storing code for wireless communication, the code comprising instructions executable by a processor to perform the method of one or more of Aspects 1-34.

Aspect 39: A non-transitory computer-readable medium storing a set of instructions for wireless communication, the set of instructions comprising one or more instructions that, when executed by one or more processors of a device, cause the device to perform the method of one or more of Aspects 1-34.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      receive scheduling information for an uplink transmission and a downlink reception in full-duplex;
      transmit, in a symbol prior to a resource associated with the uplink transmission, a reference signal using an uplink beam associated with the uplink transmission;
      measure a self-interference from the reference signal on a downlink beam associated with the downlink reception; and
      perform at least one of the uplink transmission or the downlink reception based at least in part on a self-interference measurement result associated with the reference signal.

2. The UE of claim 1, wherein the uplink beam that is used to transmit the reference signal is the uplink beam that is used for the uplink transmission when the uplink transmission is performed in full-duplex.

3. The UE of claim 1, wherein the one or more processors are further configured to:
   determine the self-interference measurement result based at least in part on measuring the self-interference, wherein performing at least one of the uplink transmission or the downlink reception is based at least in part on measuring the self-interference.

4. The UE of claim 1, wherein the symbol is configured on a number of symbols prior to the uplink transmission.

5. The UE of claim 1, wherein the symbol is immediately prior to the uplink transmission.

6. The UE of claim 1, wherein the uplink transmission comprises a dynamic shared channel.

7. The UE of claim 1, wherein the uplink transmission is on an occasion of a configured grant.

8. The UE of claim 1, wherein the uplink transmission is associated with multiple transmission occasions, and wherein each of the multiple transmission occasions is configured with a respective symbol for transmission of a respective reference signal.

9. The UE of claim 1, wherein the uplink transmission is associated with multiple transmission occasions, and wherein a subset of the multiple transmission occasions are configured with a respective symbol for transmission of a respective reference signal.

10. The UE of claim 1, wherein the uplink transmission and the reference signal are associated with a same transmit power.

11. The UE of claim 1, wherein the uplink transmission is associated with a first transmit power and the reference signal is associated with a second transmit power different than the first transmit power.

12. The UE of claim 1, wherein the one or more processors are further configured to:
receive, prior to transmitting the reference signal, downlink control information including an indication to transmit the reference signal.

13. The UE of claim 1, wherein the one or more processors are further configured to:
determine to transmit the reference signal based at least in part on a rule.

14. The UE of claim 13, wherein the rule is based at least in part on there having been no prior full-duplex communications within a threshold length of time of the uplink transmission.

15. The UE of claim 13, wherein the rule is based at least in part on a number of overlapped configured grant occasions.

16. The UE of claim 1, wherein the self-interference measurement result is a self-interference measurement associated with the reference signal that satisfies a threshold, and wherein the one or more processors, when performing at least one of the uplink transmission or the downlink reception, are configured to:
drop the uplink transmission based at least in part on the self-interference measurement satisfying the threshold and based at least in part on a priority of the uplink transmission being lower than a priority of the downlink reception.

17. The UE of claim 16, wherein the one or more processors are further configured to:
transmit, in association with feedback associated with the downlink reception, an indication that the uplink transmission was dropped or will be dropped in a number of upcoming transmission occasions.

18. The UE of claim 1, wherein the self-interference measurement result is a self-interference measurement associated with the reference signal that satisfies a threshold, and wherein the one or more processors, when performing at least one of the uplink transmission or the downlink reception, are configured to:
drop the downlink reception based at least in part on the self-interference measurement satisfying the threshold and based at least in part on a priority of the uplink transmission being higher than a priority of the downlink reception.

19. The UE of claim 18, wherein the one or more processors are further configured to:
transmit, in association with the uplink transmission, an indication that the downlink reception was dropped or will be dropped in a number of upcoming reception occasions.

20. The UE of claim 1, wherein the self-interference measurement result is a self-interference measurement associated with the reference signal that satisfies a threshold, and wherein the one or more processors, when performing at least one of the uplink transmission or the downlink reception, are configured to:
drop a selected communication, of the downlink reception or the uplink transmission, based at least in part on the self-interference measurement satisfying the threshold and based at least in part on a rule indicating which communication to drop when a priority of the uplink transmission is equal to a priority of the downlink reception.

21. The UE of claim 1, wherein the self-interference measurement result is a self-interference measurement associated with the reference signal that satisfies a threshold, and wherein the one or more processors, when performing at least one of the uplink transmission or the downlink reception, are configured to:
transmit the uplink transmission and dropping the downlink reception.

22. The UE of claim 1, wherein the reference signal is transmitted in half-duplex mode.

23. A network entity for wireless communication, comprising:
one or more memories; and
one or more processors, coupled to the one or more memories, configured to:
transmit scheduling information for an uplink transmission by a user equipment (UE) and a downlink transmission to the UE in full-duplex;
configure, in a symbol prior to a resource associated with the uplink transmission, a reference signal to be transmitted by the UE; and
perform at least one of the downlink transmission or reception of the uplink transmission based at least in part on a self-interference from the reference signal on a downlink receive beam at the UE.

24. The network entity of claim 23, wherein the symbol is configured on a number of symbols prior to the uplink transmission.

25. The network entity of claim 23, wherein the symbol is immediately prior to the uplink transmission.

26. The network entity of claim 23, wherein the uplink transmission comprises a dynamic shared channel.

27. A method of wireless communication performed by a user equipment (UE), comprising:
receiving scheduling information for an uplink transmission and a downlink reception in full-duplex;
transmitting, in a symbol prior to a resource associated with the uplink transmission, a reference signal using an uplink beam associated with the uplink transmission;
measuring a self-interference from the reference signal on a downlink beam associated with the downlink reception; and
performing at least one of the uplink transmission or the downlink reception based at least in part on a self-interference measurement result associated with the reference signal.

28. The method of claim 27, wherein the uplink beam that is used to transmit the reference signal is the uplink beam that is used for the uplink transmission when the uplink transmission is performed in full-duplex.

29. A method of wireless communication performed by a network entity, comprising:
transmitting scheduling information for an uplink transmission by a user equipment (UE) and a downlink transmission to the UE in full-duplex;
configuring, in a symbol prior to a resource associated with the uplink transmission, a reference signal to be transmitted by the UE; and
performing at least one of the downlink transmission or reception of the uplink transmission based at least in part on a self-interference from the reference signal on a downlink receive beam at the UE.

30. The method of claim 29, wherein the symbol is configured on a number of symbols prior to the uplink transmission.

* * * * *